US012666127B2

(12) United States Patent
Oh et al.

(10) Patent No.: US 12,666,127 B2
(45) Date of Patent: Jun. 23, 2026

(54) DISPLAY DEVICE HAVING AN INTEGRATED WIDE ANGLE CAMERA SYSTEM

(71) Applicant: Dell Products L.P., Round Rock, TX (US)

(72) Inventors: Guentaek Oh, Singapore (SG); Seongyong Kim, Singapore (SG); Yonggu Kang, Singapore (SG)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 18/588,125

(22) Filed: Feb. 27, 2024

(65) Prior Publication Data

US 2025/0274648 A1     Aug. 28, 2025

(51) Int. Cl.
*H04N 23/57* (2023.01)
*H04N 23/55* (2023.01)

(52) U.S. Cl.
CPC ............. *H04N 23/57* (2023.01); *H04N 23/55* (2023.01)

(58) Field of Classification Search
CPC ............................... H04N 23/57; H04N 23/55
See application file for complete search history.

(56) References Cited

U.S. PATENT DOCUMENTS

| | | | |
|---|---|---|---|
| 2016/0119520 A1* | 4/2016 | Park ....................... | H04N 23/57 348/373 |
| 2020/0329178 A1* | 10/2020 | Moon ................. | H04M 1/0214 |
| 2021/0360136 A1* | 11/2021 | Yi ............................ | H04N 5/76 |
| 2022/0217253 A1* | 7/2022 | Tian ....................... | H04N 23/51 |
| 2022/0382132 A1* | 12/2022 | Baxter .................. | G03B 17/02 |
| 2023/0098395 A1* | 3/2023 | O'Leary .................. | H04N 7/15 348/14.03 |
| 2023/0103098 A1* | 3/2023 | Nakata ................. | H04N 23/698 348/36 |
| 2023/0319428 A1* | 10/2023 | Tesdahl ................. | G06T 3/4053 348/78 |

OTHER PUBLICATIONS

List of Patents or Patent Applications Treated as Related, Nov. 2024.

* cited by examiner

*Primary Examiner* — Twyler L Haskins
*Assistant Examiner* — John H Morehead, III
(74) *Attorney, Agent, or Firm* — Terrile, Cannatti & Chambers, LLP; Stephen A. Terrile

(57) ABSTRACT

A display device which includes a display component; a display frame; an embedded camera system, the embedded camera system including a camera component, the camera component being physically coupled to the display frame to embed the camera component within the display device and a lens component, the lens component comprising a normal field of view lens portion and a wide angle field of view lens portion.

12 Claims, 10 Drawing Sheets

710

DISTORTED IMAGE

720

CORRECTED IMAGE

DISPLAY DEVICE HAVING AN INTEGRATED WIDE ANGLE CAMERA SYSTEM

BACKGROUND OF THE INVENTION

Field of the Invention

The present invention relates to information handling systems. More specifically, embodiments of the invention relate to information handling system display devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

An information handling system display device which includes an integrated camera system is disclosed.

More specifically, in one embodiment the invention relates to an embedded camera system for a display device comprising: a camera component, the camera component being physically coupled to a display frame to embed the camera component within the display device; and, a lens component, the lens component comprising a normal field of view lens portion and a wide angle field of view lens portion.

In another embodiment the invention relates to a display device comprising: a display component; a display frame; an embedded camera system, the embedded camera system comprising a camera component, the camera component being physically coupled to a display frame to embed the camera component within the display device; and, a lens component, the lens component comprising a normal field of view lens portion and a wide angle field of view lens portion.

In another embodiment the invention relates to a system comprising: a processor; a data bus coupled to the processor; and a display device, the display device comprising an embedded camera system, the embedded camera system comprising a camera component, the camera component being physically coupled to a display frame to embed the camera component within the display device; and, a lens component, the lens component comprising a normal field of view lens portion and a wide angle field of view lens portion.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
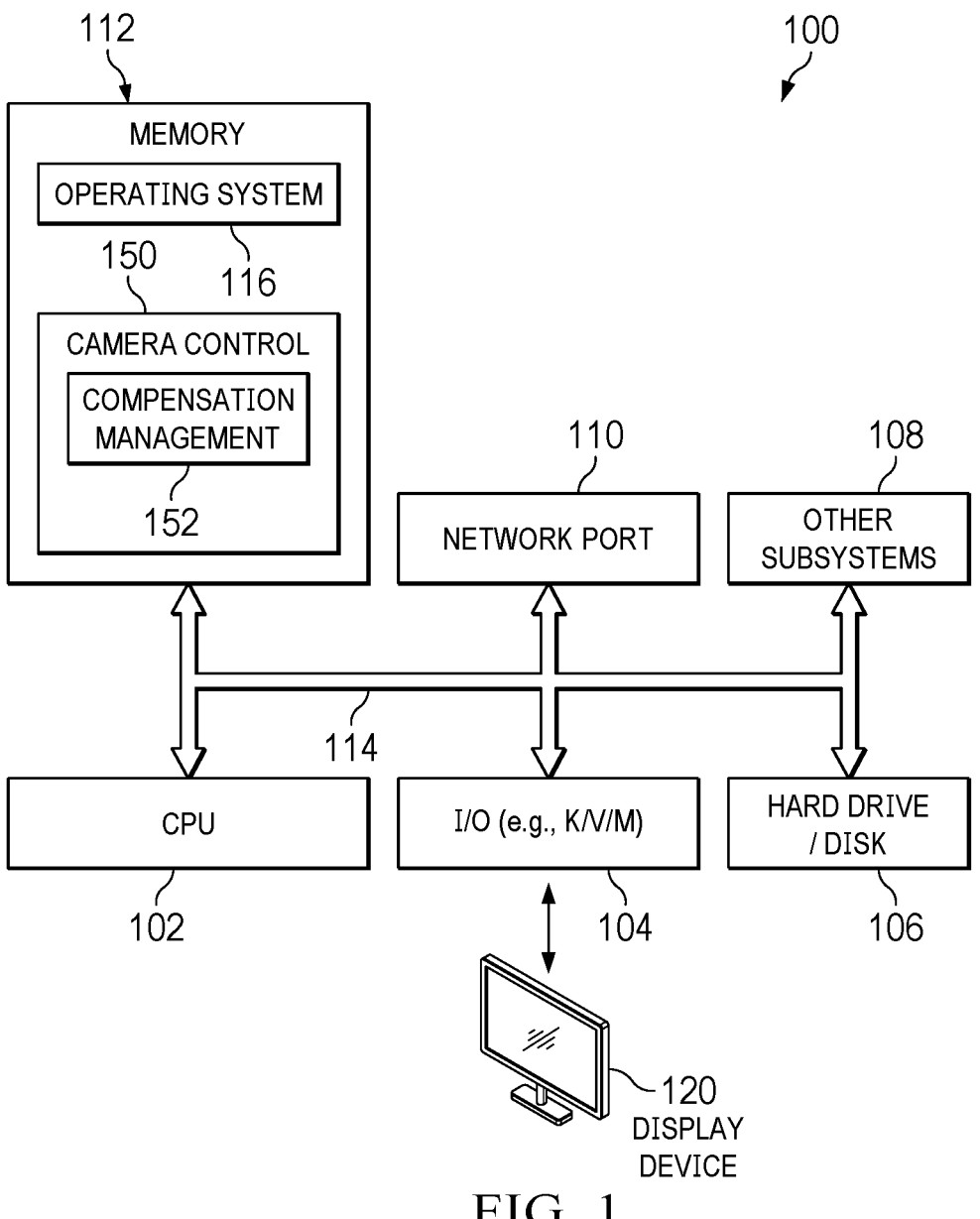
FIG. 1 shows a general illustration of components of an information handling system as implemented in the present disclosure.

Certain aspects of the present disclosure include an appreciation that camera systems often have an associated field of view. As used herein, field of view refers to an open observable area of an optical device such as a camera system. Accordingly, a field of view represents how much of an area a device can observe. Various aspects of the present disclosure include an appreciation that a normal field of view often ranges from a 65 degree field of view to a 90 degree field of view. Various aspects of the present disclosure include an appreciation that a wide angle field of view often includes a field of view of substantially (i.e., +/−20%) 120 degrees. Various aspects of the present disclosure include an appreciation that a 65 degree field of view provides an optical device with a view of a user positioned in front of the optical device, a 78 degree field of view provides an optical device with a view of a user positioned in front of the optical device as well as a desk space surrounding the user and a 90 degree field of view provides an optical device with a view of a user positioned in front of the optical device as well as additional space surrounding the user. Various aspects of the present disclosure include an appreciation that a 90 degree field of view is often referred to as a wide angle field of view. Various aspects of the present disclosure include an appreciation that a wide angle field of view is often used to provide a conferencing function. Various aspects of the present disclosure include an appreciation that a conferencing function provides an optical device with a field of view which allows a simultaneous view of a plurality of user positioned in front of the optical device.

Certain aspects of the disclosure reflect an appreciation that it would be desirable to provide display devices which include embedded camera systems with a wide angle field of view function (also referred to as a wide angle function). Certain aspects of the disclosure reflect an appreciation that certain known embedded camera systems include embedded lens systems. Certain aspects of the disclosure reflect an appreciation that it is challenging to provide embedded lens systems to certain known display devices, such as narrow bezel display devices. With certain narrow bezel display devices there is not enough space on the bezel to allow for a wide angle field of view lens system.

Accordingly, a system and method are disclosed for providing an information handling system display device with an embedded camera system having an embedded wide angle lens system. In various embodiments, the embedded camera system includes a camera component, lens component, a display frame portion, a display device frame portion, or a combination thereof. In certain embodiments, the camera component is embedded along an edge of the display device frame portion. In certain embodiments, the camera component is embedded along a top edge of the display device frame portion. In certain embodiments, the camera component is embedded in a center area of the display device frame portion.

In certain embodiments, the lens system is mounted along an edge of the display device frame portion. In certain embodiments, the lens system is mounted along a top edge of the display device frame portion. In certain embodiments, the lens system is mounted in a center area of the display device frame portion. In certain embodiments, the lens system is mounted in front of the camera component.

In certain embodiments, the lens system includes a normal lens portion and a wide angle field of view portion. In certain embodiments, the wide angle field of view portion includes a metasurface component. In certain embodiments, the camera system includes a camera control system. In certain embodiments, the camera control system includes a compensation management module. In certain embodiments, the compensation management module manages distortion produced by the wide angle field of view portion, shading irregularities produced by the wide angle field of view portion, or a combination thereof. In certain embodiments, the compensation management module includes an image signal processor.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In various embodiments, the information handling system 100 is coupled with and communicates with a display device 120. In certain embodiments, system memory 112 includes a camera control system 150, a camera compensation management system 152, or a combination thereof. In various embodiments, the information handling system is integrated with the display device to provide an all in one (AIO) type information handling system. In certain embodiments, the information handling system 100 includes a portable information handling system which includes an integrated display device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In certain embodiments, the computer system 100, the display device 120, or a combination thereof, include an embedded camera system. In various embodiments, the embedded camera system includes a camera component, lens component, a display frame portion, a display device frame portion, or a combination thereof. In certain embodiments, the camera component is embedded along an edge of the display device frame portion. In certain embodiments, the camera component is embedded along a top edge of the display device frame portion. In certain embodiments, the camera component is embedded in a center area of the display device frame portion.

In certain embodiments, the lens system is mounted along an edge of the display device frame portion. In certain embodiments, the lens system is mounted along a top edge of the display device frame portion. In certain embodiments, the lens system is mounted in a center area of the display device frame portion. In certain embodiments, the lens system is mounted in front of the camera component.

In certain embodiments, the lens system includes a normal lens portion and a wide angle field of view lens portion. In certain embodiments, the wide angle field of view portion includes a metasurface component.

In certain embodiments, the camara system includes a camera control system. In certain embodiments, the camera control system 150 includes the compensation management system 152. In certain embodiments, the camera control system 150 controls a receiving field of view of the camera component. In certain embodiments, the camera control system 150 electronically activates the wide angle field of view lens portion. In certain embodiments, the compensation management module manages image irregularities produced by the wide angle field of view lens portion. In certain embodiments, the compensation management module manages distortion produced by the wide angle field of view lens portion, shading irregularities produced by the wide angle field of view portion, or a combination thereof. In certain embodiments, the compensation management module includes an image signal processor.

Figure 2:
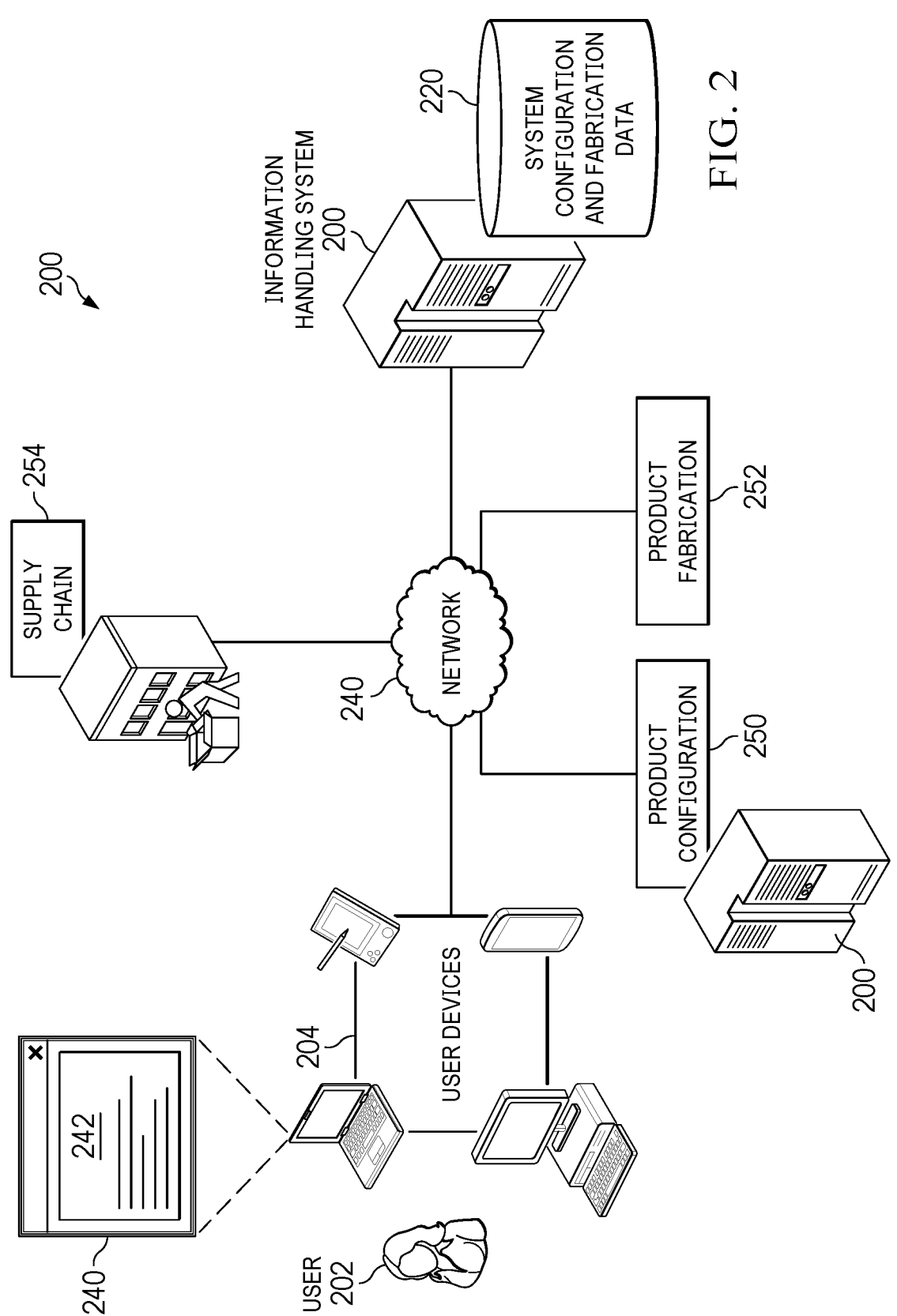
FIG. 2 shows a block diagram of an information handling system configuration and fabrication environment.

FIG. 2 is a block diagram of an information handling system configuration and fabrication environment 200 implemented in accordance with an embodiment of the invention. In certain embodiments, the information handling system configuration and fabrication environment 200 may include a repository of information handling system configuration and fabrication data 220. In certain embodiments, the repository of information handling system configuration and fabrication data 220 may be local or may be executed remotely.

In certain embodiments, the user device 204 is used to exchange information between the user 202 and a product configuration system 250, and a custom product fabrication system 250, through the use of a network 240. In certain embodiments, the network 240 may be a public network, such as a public internet protocol (IP) network, a physical private network, a wireless network, a virtual private network (VPN), or any combination thereof. Skilled practitioners of the art will recognize that many such embodiments are possible and the foregoing is not intended to limit the spirit, scope or intent of the invention. As used herein, a user device 204 refers to an information handling system such as a personal computer, a laptop computer, a tablet computer, a personal digital assistant (PDA), a smart phone, a mobile telephone, or other device that is capable of communicating and processing data. In certain embodiments, the user device 204 may be configured to present a configuration and/or fabrication system user interface (UI) 240. In certain embodiments, the configuration and/or fabrication system UI 240 may be implemented to present a graphical representation 242 of configuration and/or fabrication information.

In various embodiments, the configuration and/or fabrication system UI 240 may be presented via a website. In certain embodiments, the website may be provided by the product configuration system 250. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input to a web server.

In certain embodiments, the user device 204 may be implemented to interact with the product configuration system 250, which in turn may be executing on a separate information handling system 200. In various embodiments, the product configuration system 250 interacts with a custom product fabrication system 252. In various embodiments, the custom product fabrication system 252 fabricates products.

In various embodiments, the fabricated product includes a display device. In various embodiments, the display device includes an embedded camera system. In various embodiments, the embedded camera system includes a camera component, a lens component, a display device frame portion, or a combination thereof.

In certain embodiments, the camera component is embedded along an edge of the display device frame portion. In certain embodiments, the camera component is embedded along a top edge of the display device frame portion. In certain embodiments, the camera component is embedded in a center area of the display device frame portion.

Figure 3A:
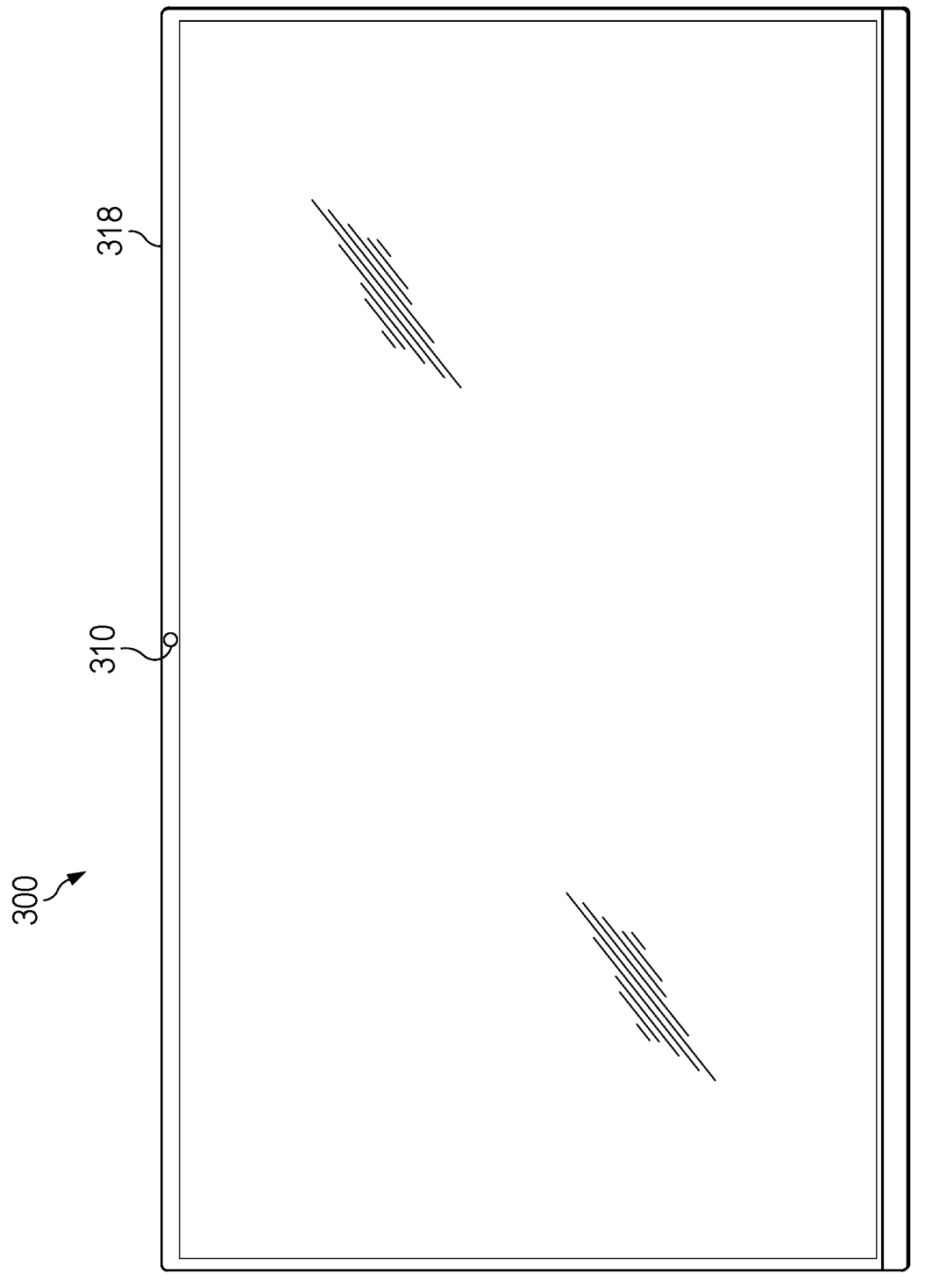
FIGS. 3A and 3B, generally referred to as FIG. 3, respectively show a front view and an exploded perspective view of a display device having an embedded camera system.
Figure 3B:
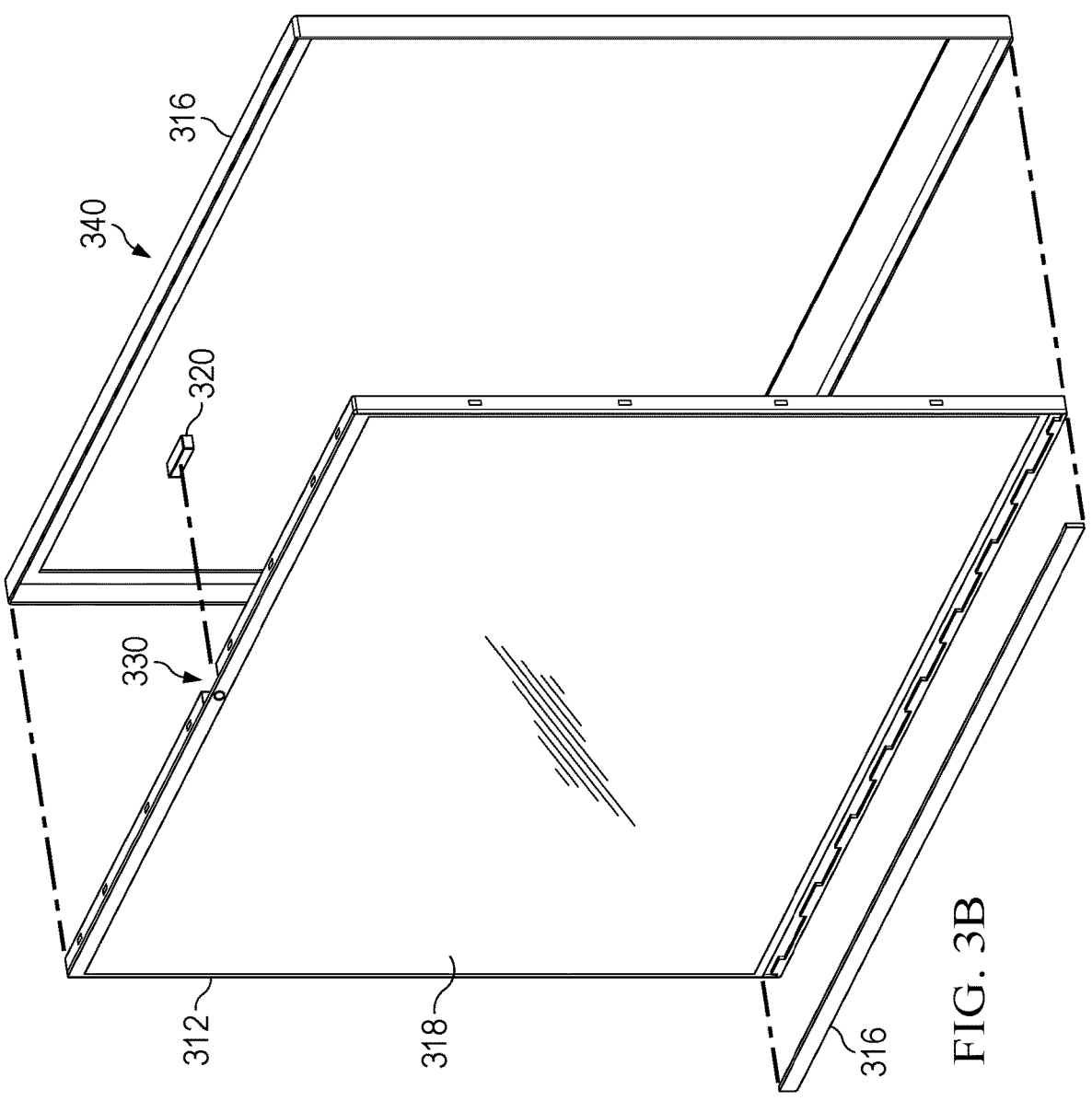

FIGS. 3A and 3B, generally referred to as FIG. 3, respectively show a front view and an exploded perspective view of a display device 300 having an embedded camera system

310. In certain embodiments, the display device 300 includes a display frame component 312, a frame component 314, a front deco component 316, or a combination thereof. In certain embodiments, a display 318 is mounted to the display frame component 312. In certain embodiments, the display device frame component 314 is integrated within a middle frame component of the display device 300. In certain embodiments, the front deco component 350 is mounted along an edge of the display frame component.

In certain embodiments, the embedded camera system 310 includes a camera component 320 having an associated lens component, a display device frame portion 330, a display device frame portion 340, or a combination thereof. In certain embodiments, the display device frame portion 330 is integrated within the display frame component 312 of the display device 300. In certain embodiments, the display device frame portion 340 is integrated within the display device frame component 314 of the display device 300.

In certain embodiments, the camera component 320 is embedded along an edge of the display device frame portion 340. In certain embodiments, the camera component 320 fits within a notch defined by the display device frame portion 330. In certain embodiments, the camera component 320 is embedded along a top edge of the display device frame portion 340. In certain embodiments, the camera component 320 is embedded in a center area of the display device frame portion 340.

In certain embodiments, the lens component is mounted along an edge of the display frame portion 330. In certain embodiments, the associated electronic lens component is mounted along a top edge of the display frame portion 330. In certain embodiments, the camera component 320, the associated lens component or a combination thereof, are mounted in a center area of the display device frame portion.

Figure 4:
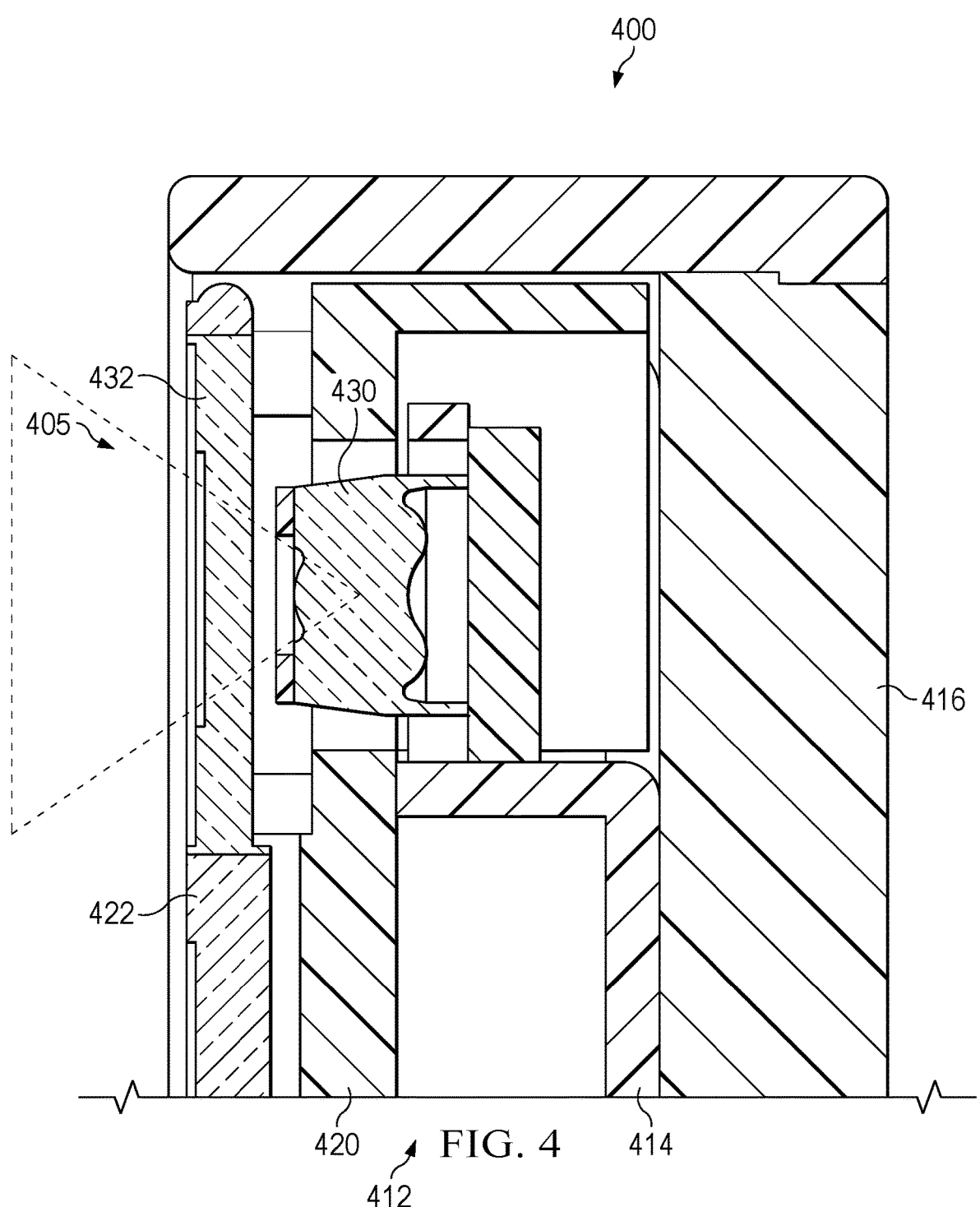
FIG. 4 shows a cut away side view of a portion of a display device having an embedded camera system.

FIG. 4 shows a cut away side view of a portion of a display device 400 having an embedded camera system 405. In certain embodiments, display device 400 corresponds to display device 300. In certain embodiments, the embedded camera system 405 corresponds to embedded camera system 310.

In certain embodiments, the display device 400 includes a display portion 412, a support frame portion 414, a rear frame portion 416, or a combination thereof. In certain embodiments, the display frame portion 412 includes a display component 420, a front display panel 422, or a combination thereof. In certain embodiments, one or both the display component 420 and the front display panel 422 are mounted to the display frame portion 412. In certain embodiments, the display device frame portion 414 is integrated within a middle frame component of the display device 400. In certain embodiments, the rear frame portion 416 is mounted along an outside edge of the support frame portion 414.

In certain embodiments, the embedded camera system 405 includes a camera component 430, an associated lens component 432, or a combination thereof. In certain embodiments, the camera component 430 is embedded along an edge of the display device frame portion 440. In certain embodiments, the camera component 430 fits within a void defined by the display frame. In certain embodiments, the camera component 430 is embedded along a top edge of the display device frame. In certain embodiments, the camera component 430 is embedded in a center area of the display device frame.

In certain embodiments, the lens component 432 is mounted in front of the camera component 430. In certain embodiments, the lens component 432 is positioned along a top edge of the front panel display 422. In certain embodiments, the camera component 430, the lens component 432 or a combination thereof, are mounted in a center area of the display device frame.

In certain embodiments, the lens component 432 includes a normal field of view lens portion and a wide angle field of view lens portion. As used herein, a normal field of view lens portion broadly refers to a lens component which provides a field of view from substantially (i.e., +/−20%) 65 degrees to substantially (i.e., +/−20%) 90 degrees As used herein, a wide angle field of view lens portion broadly refers to a lens component which a field of view greater than substantially (i.e., +/−20%) 90 degrees. In certain embodiments, the wide angle field of view lens portion provides a camera system with a conferencing function.

In certain embodiments, the normal field of view lens portion is constructed from plastic, glass, or a combination thereof. In certain embodiments, the wide angle field of view portion includes a metasurface component. In certain embodiments, the embedded camara system 430 includes an associated camera control system. In certain embodiments, the associated camera control system includes a compensation management module. In certain embodiments, the compensation management module manages distortion produced by the wide angle field of view portion, shading irregularities produced by the wide angle field of view portion, or a combination thereof. In certain embodiments, the compensation management module includes an image signal processor.

Figure 5A:
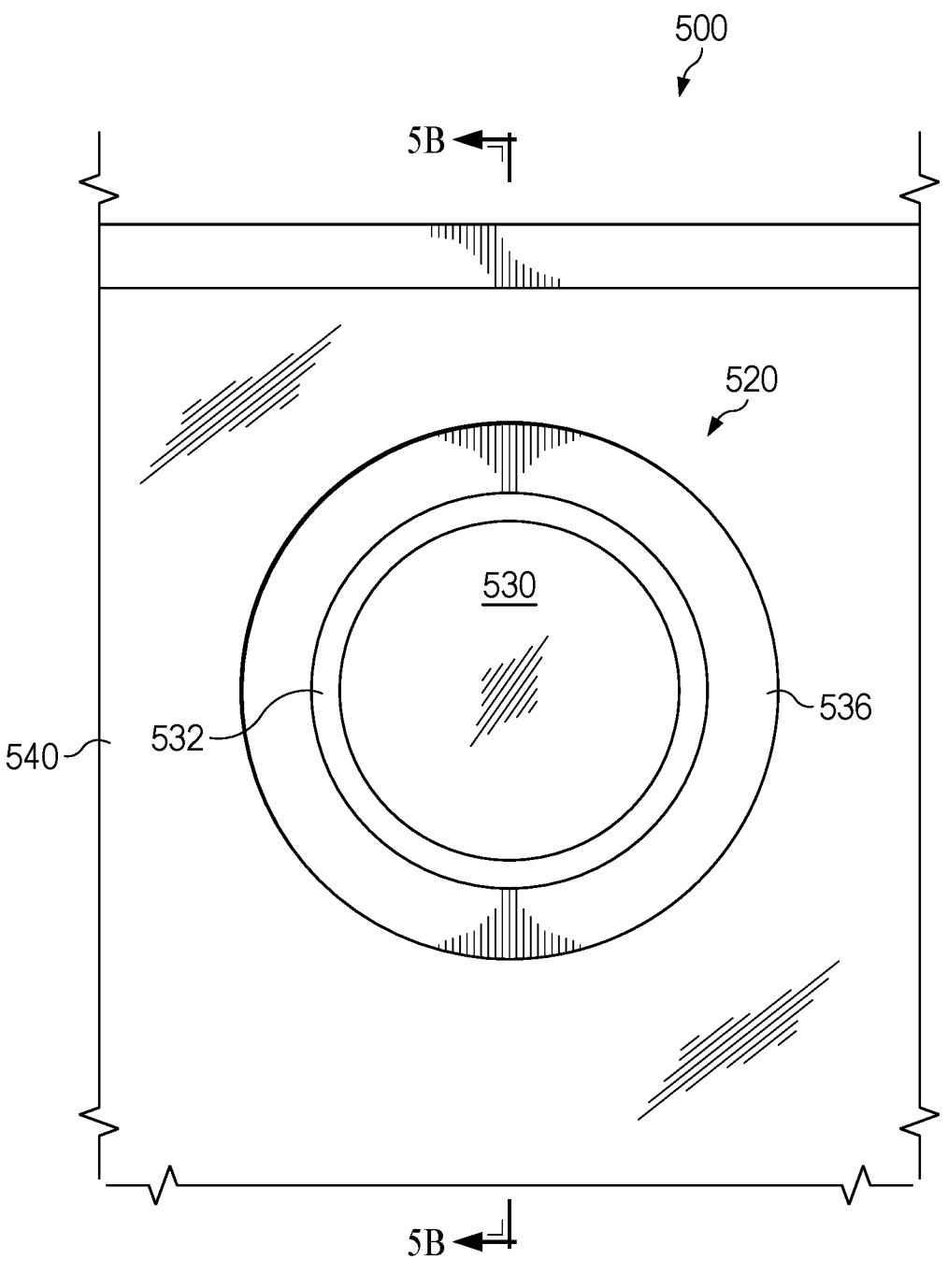
FIGS. 5A and 5B, generally referred to as FIG. 5, respectively show front and side views of a wide angle camera system.
Figure 5B:
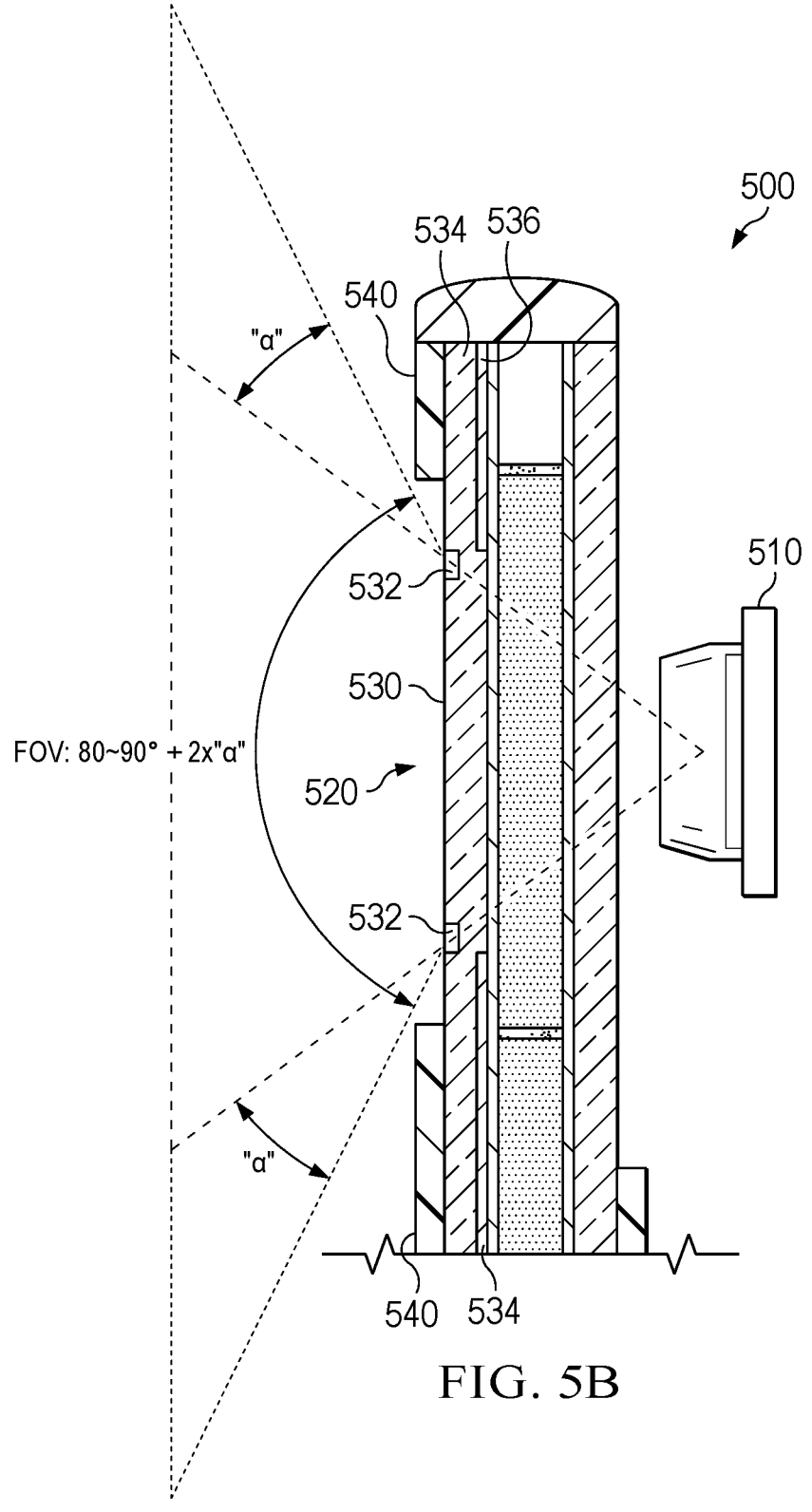

FIGS. 5A and 5B, generally referred to as FIG. 5, respectively show front and side views of a wide angle field of view camera system 500. In certain embodiments, the wide angle field of view camera system 500 includes a camera component 510, a lens component 520, or a combination thereof. In certain embodiments, the lens component 520 includes a normal field of view lens portion 530, a wide angle field of view lens portion 532, or a combination thereof. In certain embodiments, the lens component 520 further includes a filter glass portion 534, a lens edge portion 536, or a combination thereof. In certain embodiments, the lens edge portion 534 includes a black matrix which defines an outside edge of the lens component 520. In certain embodiments, the normal field of view lens portion 530, the wide angle field of view lens portion 532, the lens edge portion 534, or a combination thereof, are substantially (i.e., +/−20%) circularly shaped. In certain embodiments, the wide angle field of view lens portion 532 encircles the normal field of view lens portion 530. In certain embodiments, an outside edge of the normal field of view lens portion 530 is contiguous with an inside edge of the wide angle field of view lens portion 532.

In certain embodiments, the lens component 520 is configured with a first predetermined diameter. In certain embodiments, the normal field of view lens portion 530 is configured with a second predetermined diameter. In certain embodiments, the second predetermined diameter is smaller than the first predetermined diameter. In certain embodiments, the first predetermined diameter is a combination of the second predetermined diameter and an additional diameter provided by the wide angle field of view lens portion 532. In certain embodiments, the additional diameter provided by the wide angle field of view lens portion 532 is substantially smaller (i.e., +/−15%) than the second predetermined diameter.

In certain embodiments, the wide angle field of view lens portion 532 is constructed to include a metasurface component. In certain embodiments, the metasurface component is mounted on color filter glass portion 534 of the lens component 520. As used herein, a metasurface broadly refers to a sheet material having a sub-wavelength thickness which controls behaviors of electromagnetic waves. In certain embodiments, the metasurface includes plasmonics which provide an ultrathin layer of metamaterials which control a wavefront of optical beams. Controlling a wavefront of electromagnetic waves enables the metasurface to impart local, gradient phase shifts to the incoming waves such that the metasurface provides a lens function.

In certain embodiments, the metasurface component includes a plurality of unit cells. As used herein, a unit cell of a metasurface broadly refers to a metasurface subcomponent which includes a plurality of silicon nanodisks. In certain embodiments, the plurality of nanodisks of the metasurface subcomponent are represented by a plurality of parameters. In certain embodiments, the plurality of parameters includes a diameter parameter and a height parameter of each nanodisk, or a combination thereof. In certain embodiments, the plurality of parameters includes a gap parameter representing a gap between two nanodisks within a unit cell, a period parameter representing a period of repeating unit cells, or a combination thereof. In certain embodiments, the plurality of parameters may be adjusted to achieve a desired surface refractive index. In certain embodiments, the plurality of parameters are adjusted to control the sizes and shapes of the plurality of unit cells are adjusted to achieve a desired surface refractive index. In certain embodiments, unit cell sizes and shapes of the wide field of view lens portion 532 are adjusted so that functions can be patterned on the surface of the metasurface.

Figure 6A:
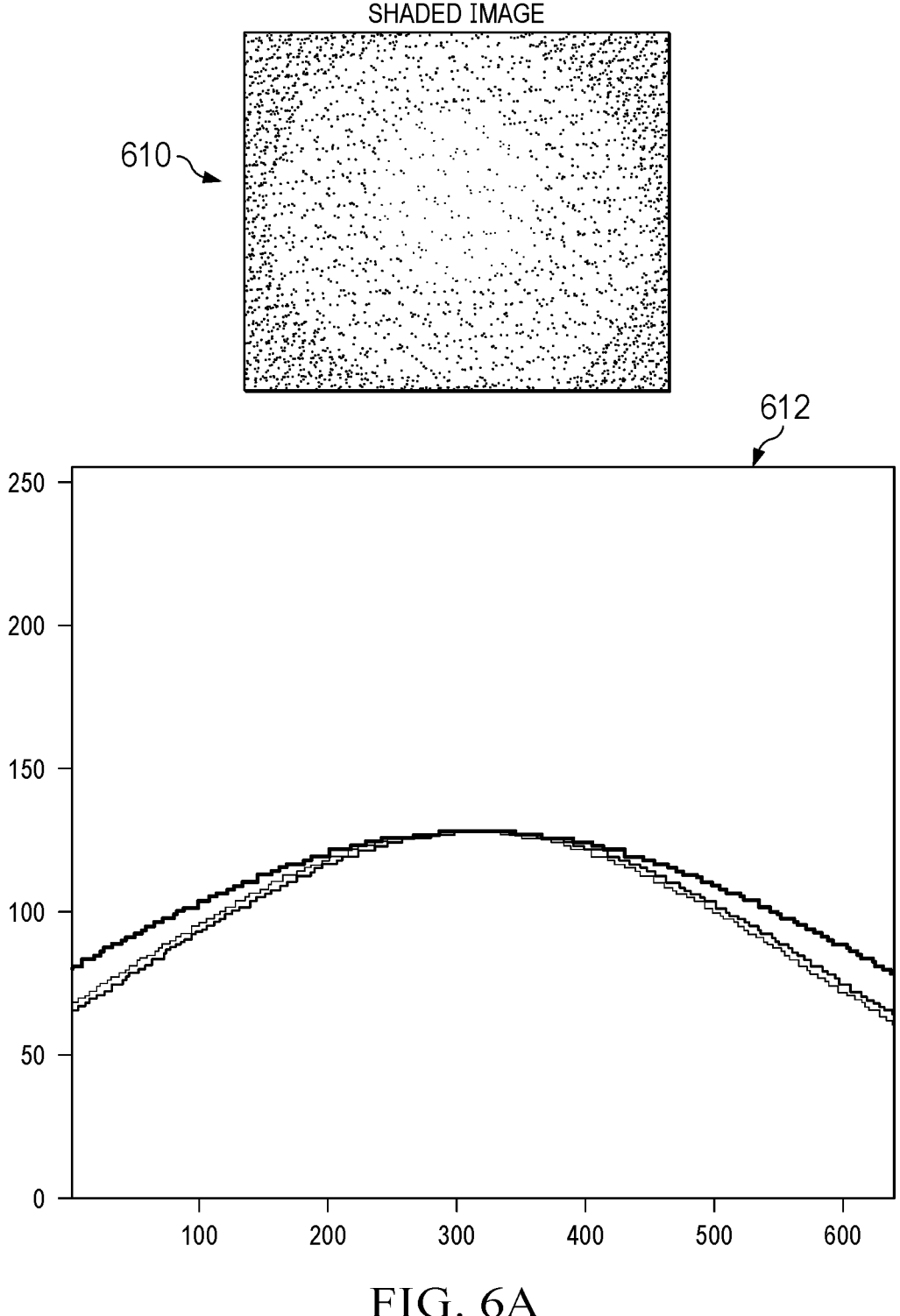
FIGS. 6A and 6B, generally referred to as FIG. 6, respectively show examples of a wide angle shaded image and a wide angle corrected image.
Figure 6B:
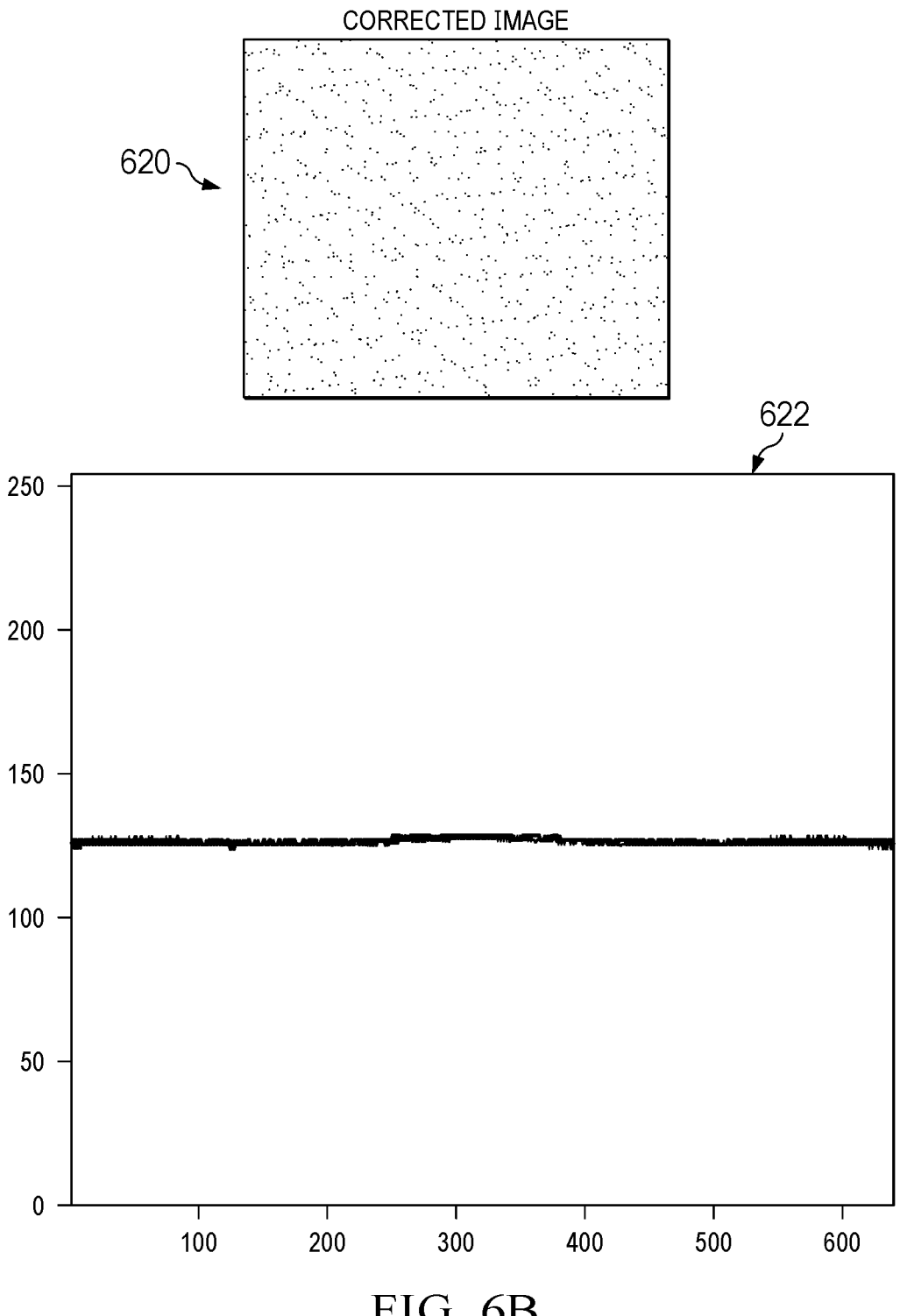

FIGS. 6A and 6B, generally referred to as FIG. 6, respectively show examples of a wide angle shaded image and a wide angle corrected image. More specifically, a wide angle gradient shaded image 610 is produced via a wide angle lens component (such as lens component 432) which includes a normal field of view lens and a wide angle field of view lens. In certain embodiments, the shaded image is represented as a red, green, blue (RGB) image. In certain embodiments, the red, green and blue each have respective shading characteristics 612.

In certain embodiments, a camera compensation management system (such as camera compensation system 152) manages shading irregularities produced by the wide angle field of view portion of the lens system. In certain embodiments, managing the shading irregularities via the camera compensation management system produces a uniform shaded image 620 which includes uniform shading characteristics 622.

In certain embodiments, the transition from a normal field of view lens portion to a wide angle field of view lens portion produces a pronounced shading irregularity at the shading boundary produced by the image generated which include both the normal field of view lens portion and the wide angle field of view lens portion. In certain embodiments, a camera compensation management system manages the pronounced shading irregularity produced by the image generated which includes both the normal field of view lens portion and the wide angle field of view lens portion.

Figure 7A:
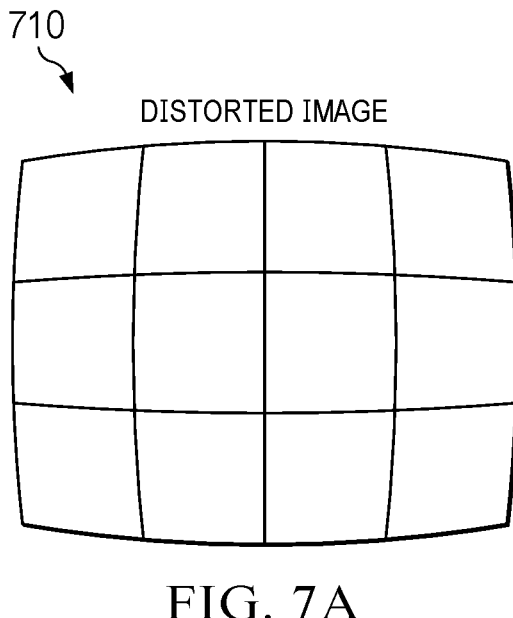
FIGS. 7A and 7B, generally referred to as FIG. 7, respectively show examples of a wide angle distorted image and a wide angle corrected image.
Figure 7B:
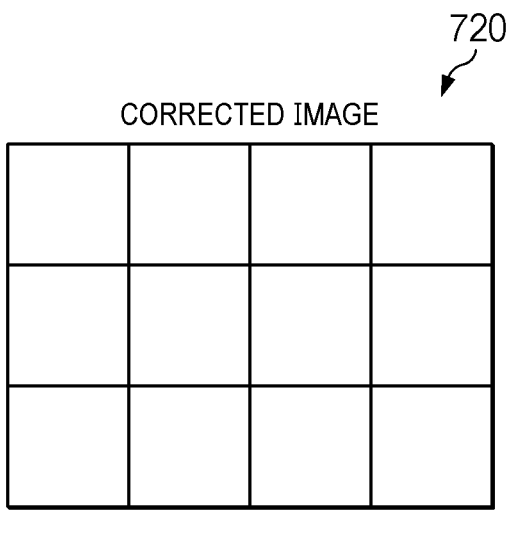

FIGS. 7A and 7B, generally referred to as FIG. 7, respectively show examples of a wide angle distorted image and a wide angle corrected image. More specifically, a wide angle distorted image 710 is produced via a wide angle lens component (such as lens component 432) which includes a normal field of view lens and a wide angle field of view lens. In certain embodiments, a camera compensation management system (such as camera compensation system 152) manages image distortion irregularities produced by the wide angle field of view portion of the lens system. In certain embodiments, managing the image distortion irregularities via the camera compensation management system produces a corrected image 720 which includes mitigated distortion characteristics.

In certain embodiments, the transition from a normal field of view lens portion to a wide angle field of view lens portion produces a pronounced image distortion irregularity produced by the image generated which include both the normal field of view lens portion and the wide angle field of view lens portion. In certain embodiments, a camera compensation management system manages the pronounced image distortion irregularity produced by the image generated which includes both the normal field of view lens portion and the wide angle field of view lens portion.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An embedded camera system for a display device comprising:
a camera component, the camera component being physically coupled to a display frame to embed the camera component within the display device; and,
a lens component, the lens component comprising a normal field of view lens portion and a wide angle field of view lens portion; and wherein
the wide angle field of view lens portion is constructed to include a metasurface component;
the lens component includes a color filter glass portion; and,
the metasurface component is mounted on the color filter glass portion of the lens component.

2. The embedded camera system of claim 1, wherein:
an outside edge of the normal field of view lens portion is contiguous with an inside edge of the wide angle field of view lens portion.

3. The embedded camera system of claim 1, further comprising:
a camera control system, the camera control system controlling a receiving field of view of the camera component.

4. The embedded camera system of claim 3, wherein:
the camera control system includes a camera compensation management system, the camera compensation management system managing image irregularities produced by the wide angle field of view lens portion.

5. A display device comprising:
a display component;
a display frame;

an embedded camera system, the embedded camera system comprising
a camera component, the camera component being physically coupled to a display frame to embed the camera component within the display device; and,
a lens component, the lens component comprising a normal field of view lens portion and a wide angle field of view lens portion; and wherein
the wide angle field of view lens portion is constructed to include a metasurface component;
the lens component includes a color filter glass portion; and,
the metasurface component is mounted on the color filter glass portion of the lens component.

6. The display device of claim 5, wherein:
an outside edge of the normal field of view lens portion is contiguous with an inside edge of the wide angle field of view lens portion.

7. The display device of claim 5, wherein the embedded camera system further comprises:
a camera control system, the camera control system controlling a receiving field of view of the camera component.

8. The display device of claim 7, wherein:
the camera control system includes a camera compensation management system, the camera compensation management system managing image irregularities produced by the wide angle field of view lens portion.

9. A system comprising:
a processor;
a data bus coupled to the processor; and
a display device, the display device comprising
a display component;
a display frame;
an embedded camera system, the embedded camera system comprising
a camera component, the camera component being physically coupled to a display frame to embed the camera component within the display device; and,
a lens component, the lens component comprising a normal field of view lens portion and a wide angle field of view lens portion; and wherein
the wide angle field of view lens portion is constructed to include a metasurface component;
the lens component includes a color filter glass portion; and,
the metasurface component is mounted on the color filter glass portion of the lens component.

10. The system of claim 9, wherein:
an outside edge of the normal field of view lens portion is contiguous with an inside edge of the wide angle field of view lens portion.

11. The system of claim 10, wherein the embedded camera system further comprises:
a camera control system, the camera control system controlling a receiving field of view of the camera component.

12. The system of claim 11, wherein:
the camera control system includes a camera compensation management system, the camera compensation management system managing image irregularities produced by the wide angle field of view lens portion.

* * * * *